(12) United States Patent
Yoo

(10) Patent No.: US 11,288,545 B2
(45) Date of Patent: Mar. 29, 2022

(54) ARTIFICIAL INTELLIGENCE NEURAL NETWORK APPARATUS AND DATA CLASSIFICATION METHOD WITH VISUALIZED FEATURE VECTOR

(71) Applicant: Research & Business Foundation Sungkyunkwan University, Suwon-si (KR)

(72) Inventor: Jae-Chern Yoo, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 60 days.

(21) Appl. No.: 16/927,067

(22) Filed: Jul. 13, 2020

(65) Prior Publication Data

US 2021/0224604 A1 Jul. 22, 2021

(30) Foreign Application Priority Data

Jan. 17, 2020 (KR) ........................ 10-2020-0006352

(51) Int. Cl.
*G06K 9/62* (2022.01)
*G06N 3/08* (2006.01)

(52) U.S. Cl.
CPC ......... *G06K 9/6261* (2013.01); *G06K 9/6256* (2013.01); *G06K 9/6269* (2013.01); *G06N 3/08* (2013.01)

(58) Field of Classification Search
CPC .. G06K 9/6261; G06K 9/6256; G06K 9/6269; G06N 3/08; G06N 3/063; G06N 5/02; G06F 17/16

USPC ........................................................ 382/159
See application file for complete search history.

(56) References Cited

U.S. PATENT DOCUMENTS

| 10,185,893 | B2 | 1/2019 | Townsend et al. |
| 2008/0063264 | A1* | 3/2008 | Porikli ............... G06K 9/00369 382/159 |
| 2018/0150746 | A1* | 5/2018 | Tu .......................... G06N 3/088 |

(Continued)

OTHER PUBLICATIONS

Machine translation of Korean Office Action dated Jul. 13, 2020 in corresponding Korean Patent Application No. 10-2020-0006352 (Year: 2020).*

(Continued)

*Primary Examiner* — Juan A Torres
(74) *Attorney, Agent, or Firm* — NSIP Law

(57) ABSTRACT

An artificial intelligence neural network apparatus, comprising: a labeled learning database having data of a feature vector composed of N elements; a first feature vector image converter configured to visualize the data in the learning database to form an imaged learning feature vector image database; a deep-learned artificial intelligence neural network configured to use a learning feature vector image in the learning feature vector image database to perform an image classification operation; an inputter configured to receive a test image, and generate test data based on the feature vector; and a second feature vector image converter configured to visualize the test data and convert the visualized test data into a test feature vector image. The deep-learned artificial intelligence neural network is configured to determine a class of the test feature vector image.

5 Claims, 6 Drawing Sheets

(56) References Cited

U.S. PATENT DOCUMENTS

2021/0150264 A1\* 5/2021 Karanam ............... G06N 3/084

OTHER PUBLICATIONS

Written Replay (Translated) Machine translation of Korean Replay dated Jul. 30, 2020 in corresponding Korean Patent Application No. 10-2020-0006352 (Year: 2020).\*

Korean Office Action dated Jul. 13, 2020 in corresponding Korean Patent Application No. 10-2020-0006352 (4 pages in Korean).

\* cited by examiner

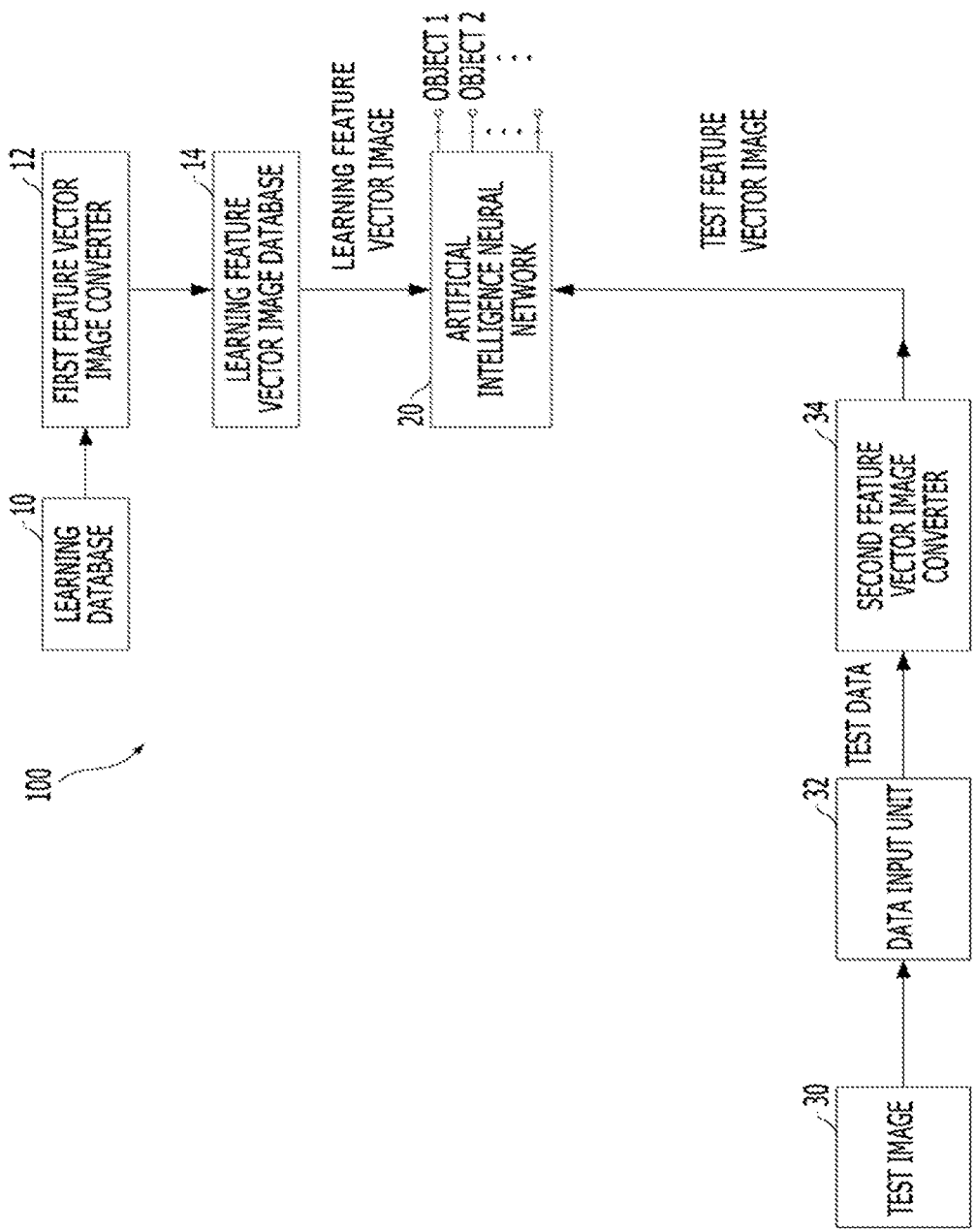
[FIG. 1]

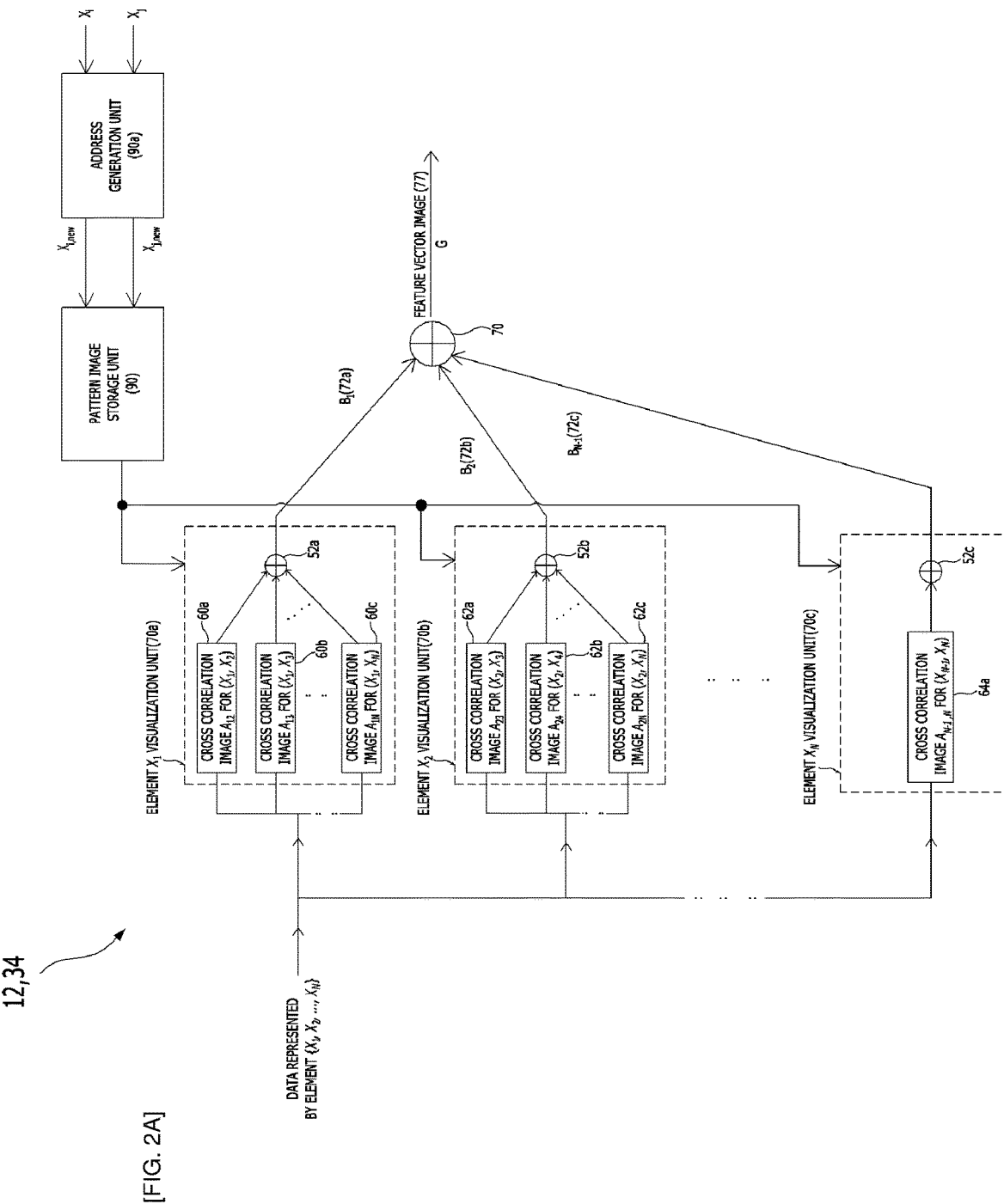
[FIG. 2A]

[FIG. 2B]
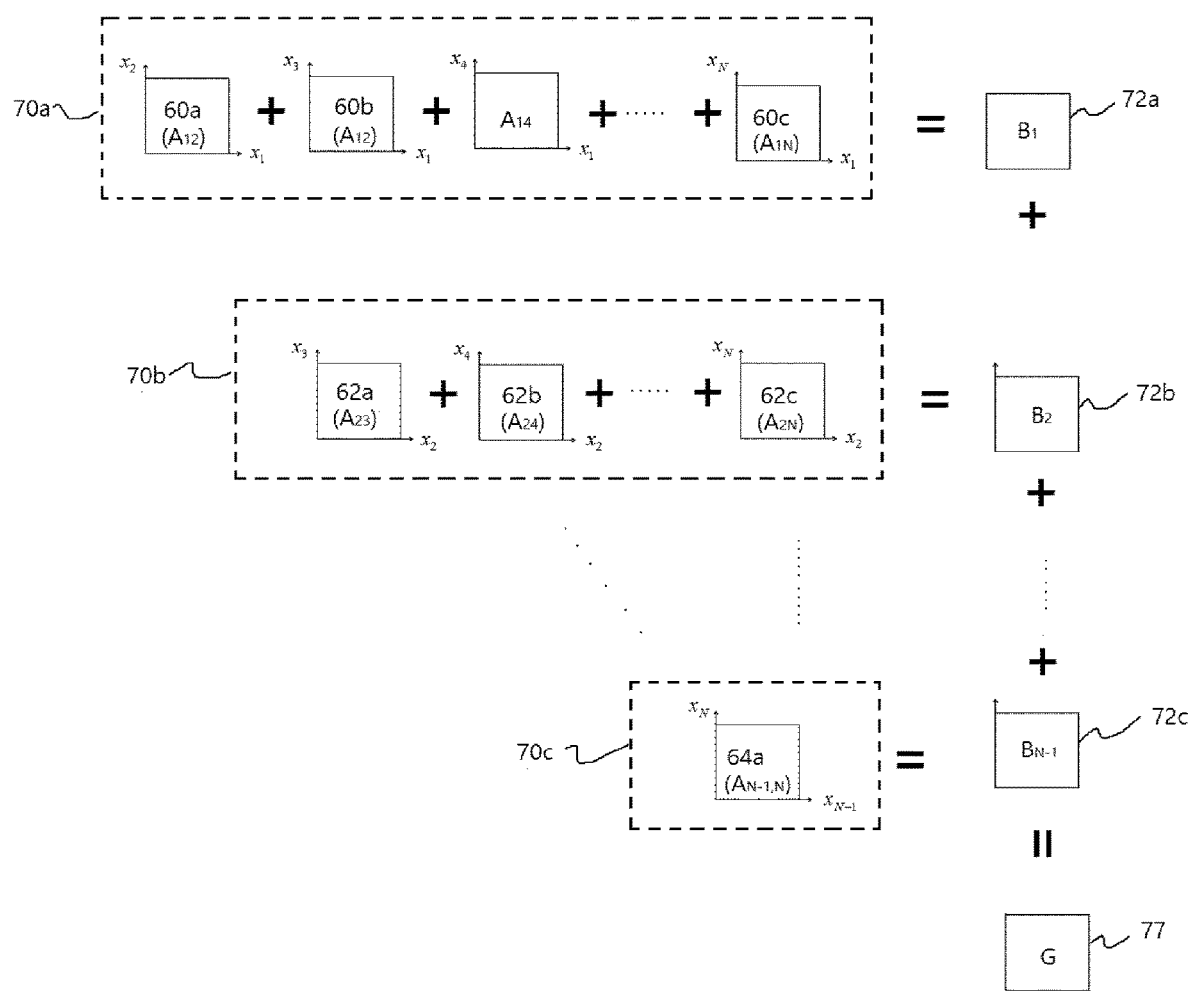

[FIG. 2C]
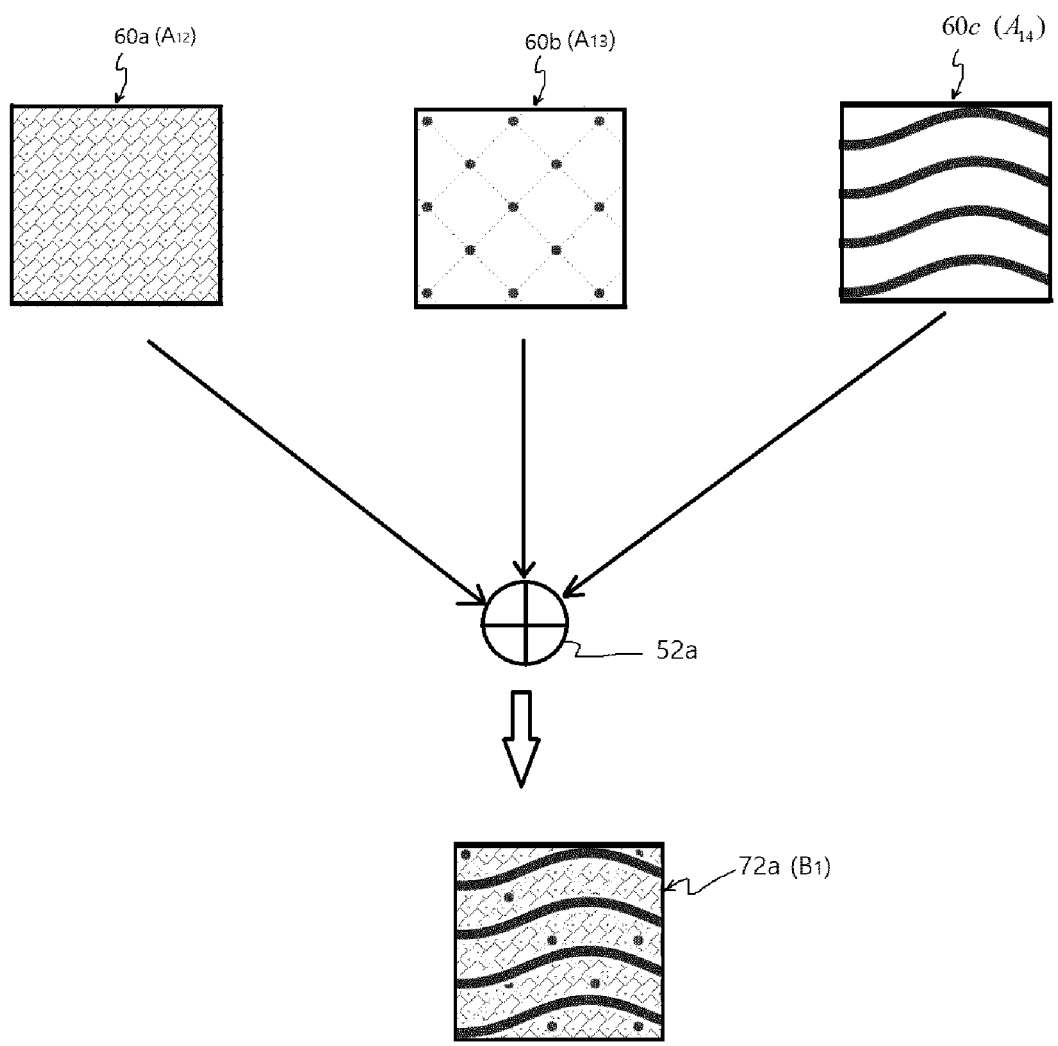

[FIG. 3A]
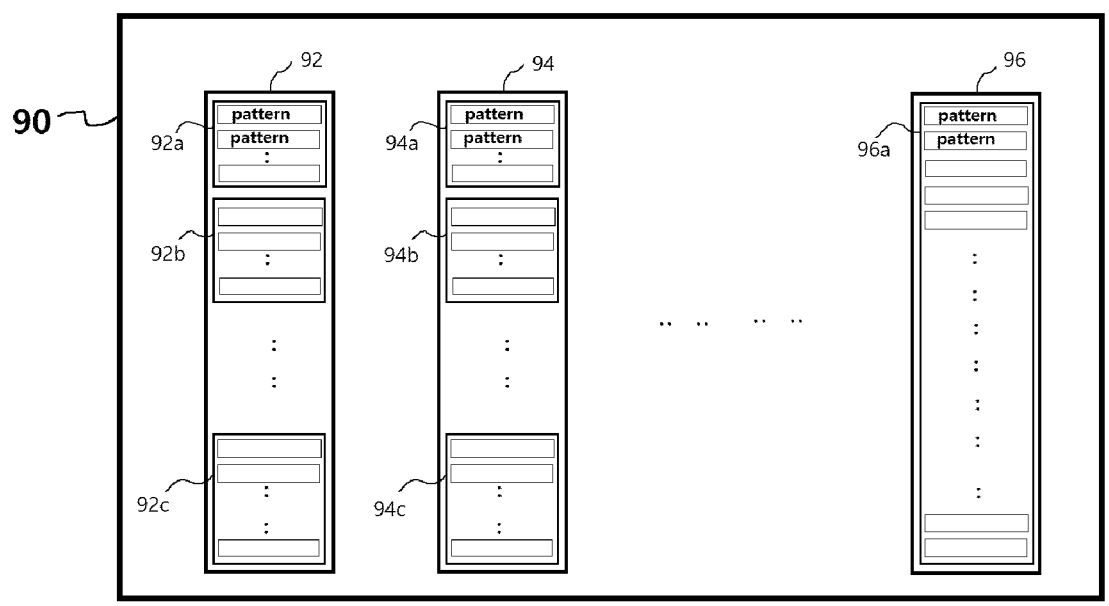

[FIG. 3B]
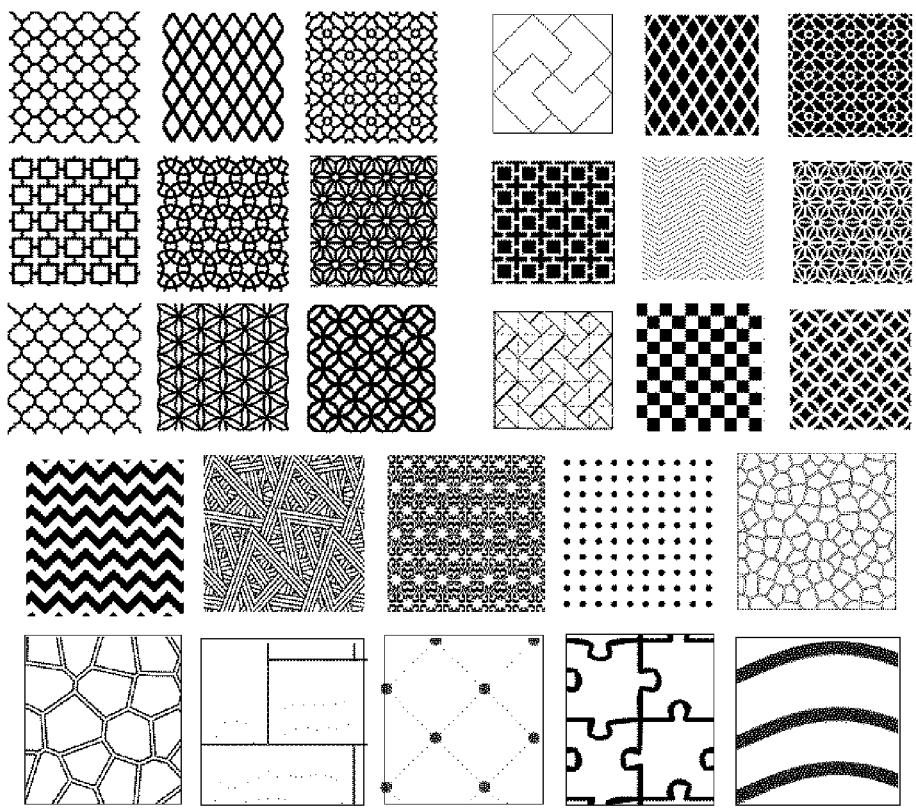

ARTIFICIAL INTELLIGENCE NEURAL NETWORK APPARATUS AND DATA CLASSIFICATION METHOD WITH VISUALIZED FEATURE VECTOR

CROSS-REFERENCE TO RELATED APPLICATIONS

This application claims the benefit under 35 USC 119(a) of Korean Patent Application No. 10-2020-0006352 filed on Jan. 17, 2020, in the Korean Intellectual Property Office, the entire disclosure of which is incorporated herein by reference for all purposes.

BACKGROUND

1. Field

The present disclosure relates to an artificial intelligence neural network apparatus and data classification method with a visualized feature vector.

2. Description of the Related Art

When a feature vector is known in advance, classifying data by machine learning is generally a well-known task. When it is assumed based on the feature vector known in advance that given data belongs to any one of a plurality of classes, the machine learning aims to determine which of the plurality of classes the new data belongs. For example, assuming that cat and dog images are classified, the machine learning previously determined feature vectors (for example, ear size, weight, skin color, and the like) that can distinguish (classify) these cats and dogs well, extracts data corresponding to the feature vectors from the given image, and classify cats or dogs using the extracted data.

A support vector machine (SVM) is known as the most representative and well-operated machine learning method, and is used for classification and regression analysis based on the given feature vectors by a supervised learning model. The SVM algorithm finds, on a multidimensional space formed by a pre-selected feature vector, a hyperplane called a decision boundary that determines, which category (or class) new data belongs to, based on the given data set.

However, the SVM has the following problems.

First, since the SVM is basically a linear separator, it is necessary to convert given data into a linear classification problem by mapping the given data to high-dimensional feature vector spaces in order to perform nonlinear classification. To efficiently perform the operation, the SVM needs to use a kernel trick.

However, the problem is that the selection of the kernel function is not clear, and the classification performance and results vary greatly depending on the selection of the kernel function.

Second, since the SVM is a two-class classifier, in order for the SVM to be used as a multiple classifier having more than two classes, a large number of SVMs need to be coupled. To this end, representatively, a "one versus one" method and a "one versus all" method have been known.

Therefore, the SVM has a problem that the amount of computation increases exponentially as the number of classes increases.

While the machine learning classifies data based on the given feature vector, a convolutional neural network (CNN), which is a kind of deep learning neural network, receives the entire image as input and automatically determines which class the corresponding image belongs to.

Therefore, if data based on the feature vector is given, only the machine learning is possible, and there is a problem in that a deep-learning artificial intelligence network with good performance such as the CNN cannot be used.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an artificial intelligence neural network apparatus coupled with a visualized feature vector, includes: a labeled learning database, a first feature vector image converter, a deep-learned artificial intelligence neural network, an inputter, and a second feature vector image converter. The labeled learning database has data of a feature vector composed of N elements. The first feature vector image converter is configured to visualize the data in the learning database to form an imaged learning feature vector image database. The deep-learned artificial intelligence neural network is configured to use a learning feature vector image in the learning feature vector image database to perform an image classification operation. The inputter is configured to receive a test image, and generate test data based on the feature vector. The second feature vector image converter is configured to visualize the test data and convert the visualized test data into a test feature vector image. The deep-learned artificial intelligence neural network is configured to determine a class of the test feature vector image.

The deep-learned artificial intelligence neural network may be deep-learned by supervised learning using the learning feature vector image stored in the learning feature vector image database.

The first feature vector image converter may include a pattern image storage configured to store pattern images of a relationship between element $x_i$ and other elements $\{x_j | j=i+1, i+2, \ldots, N\}$ for data represented by a feature vector composed of the N elements $\{x_i | i \in 1, 2, \ldots, N\}$; an address generator configured to calculate an address for reading the pattern image from the pattern image storage; an element $x_i$ visualizer configured to obtain visualized cross correlation images $\{A_{ij} | j=i+1, i+2, \ldots, N\}$ by reading a pattern image corresponding to the address generated from the address generator and mapping the pattern image read into a two-dimensional space; a first addition operator configured to generate a local pattern image $B_i$ by synthesizing cross correlation images $\{A_{ij} | j=i+1, i+2, \ldots, N\}$ obtained from the element $x_i$ visualizer; and a second addition operator configured to generate a feature vector image by synthesizing a local pattern image $\{B_i | i=1, 2, \ldots, N-1\}$ obtained from the first addition operator.

The first addition operator may further include a multiplier configured to perform multiplication of weight $W_{ij}$ by the cross correlation image $A_{ij}$; and an adder configured to perform addition to the bias $b_i$. The weight $W_{ij}$ and the bias $b_i$ are customized while being learned by a supervised learning of the deep-learned artificial intelligence neural network.

In another general aspect, an artificial intelligence neural network method, includes: visualizing data in a labeled learning database to form an imaged learning feature vector image database, wherein the labeled learning database has the data composed of N elements; using a learning feature vector image in the learning feature vector image database to perform an image classification operation; receiving a test image and generating test data based on the feature vector; visualizing the test data and converting the visualized test data into a test feature vector image; an determining a class of the test feature vector image.

The method may further include storing pattern images of a relationship between element $x_i$ and other elements $\{x_j|j=i+1, i+2, \ldots, N\}$ for data represented by a feature vector composed of the N elements $\{x_i|i \in 1, 2, \ldots, N\}$; calculating an address for reading the pattern image from the pattern image storage; obtaining visualized cross correlation images $\{A_{ij}|j=i+1, i+2, \ldots, N\}$ by reading a pattern image corresponding to the address generated from the address generator and mapping the pattern image read into a two-dimensional space; generating a local pattern image $B_i$ by synthesizing cross correlation images $\{A_{ij}|j=i+1, i+2, \ldots, N\}$ obtained from the element $x_i$ visualizer; and generating a feature vector image by synthesizing a local pattern image $\{B_l|l=1, 2, \ldots, N-1\}$ obtained from the first addition operator.

The method may further include performing multiplication of weight by the cross correlation image $A_{ij}$; and performing addition to the bias $b_i$, wherein the weight $W_{ij}$ and the bias $b_i$ are customized while being learned by a supervised learning of a deep-learned artificial intelligence neural network.

Other features and aspects will be apparent from the following detailed description, the drawings, and the claims.

BRIEF DESCRIPTION OF THE DRAWINGS

FIG. 1 is a diagram illustrating an embodiment of an artificial intelligence neural network apparatus coupled with a visualized feature vector.

FIG. 2A is a diagram illustrating an embodiment of a feature vector to image conversion unit for obtaining an imaged feature vector image by visualizing data based on the feature vector of FIG. 1.

FIG. 2B illustrates an embodiment showing a process of obtaining cross correlation images, local pattern images, and feature vector images through the feature vector to image conversion unit to visualize the data when the data is displayed as a feature vector composed of N elements.

FIG. 2C illustrates an embodiment showing a process of obtaining the cross correlation images and the local pattern images through the feature vector to image conversion unit to visualize the data when the data is displayed as a feature vector composed of four elements.

FIG. 3A is a diagram illustrating an embodiment of a pattern image storage unit 90.

FIG. 3B is a diagram illustrating an embodiment of various pattern images stored in the pattern image storage unit.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION OF THE EMBODIMENT

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

An object to be achieved by the present disclosure is to provide an artificial intelligence neural network apparatus coupled with a visualized feature vector and a data classification method thereof using the same capable of automatically classifying data by visualizing and imaging data based on a feature vector and applying the data based on the feature vector to CNN.

Further, another object to be achieved by the present disclosure is to provide an apparatus and method capable of classifying data based on a feature vector using the existing deep learning neural network by visualizing a feature vector pre-selected by a human and learning and classifying the visualized feature vector using the deep learning neural network.

Further, still another object to be achieved by the present disclosure is to provide an advantage of greatly improving feature vector extraction efficiency as well as greatly improving a learning speed of a deep learning neural network by selecting a feature vector pre-selected by a human and providing the selected feature vector to the deep learning neural network in a form that the feature vector pre-selected by a human and their own feature vector extraction ability of the deep learning neural network are coupled.

However, the technical problems to be achieved by the embodiments of the present disclosure are not limited to the technical problems as described above, and other technical problems may exist.

According to an aspect of the present disclosure, there is provided an artificial intelligence neural network apparatus coupled with a visualized feature vector includes: data that is represented by a feature vector composed of N elements; a learning database that is labeled which class the learning database belongs to and composed of data represented by the feature vector; a feature vector to image conversion unit 1 that visualizes data stored in the learning database to form an imaged learning feature vector image database; an artificial intelligence neural network that is deep-learned by supervised learning using a learning feature vector image stored in the learning feature vector image database, and then performs an image classification operation; a data input unit that receives a test image to be classified and generates test data represented by the feature vector; and a feature vector to image conversion unit 2 that visualizes the test data and converts the visualized test data into a test feature vector image, in which the deep-learned artificial intelligence neural network classifies which class the test feature vector image belongs to.

Further, the feature vector to image conversion unit includes: a pattern image storage unit that stores pattern images showing a relationship between element xi and other elements $\{x_j|j=i+1, i+2, \ldots N\}$ for data represented by a feature vector composed of N elements $\{x_j|i \in 1, 2, \ldots, N\}$; an address generation unit that calculates an address for reading the pattern image from the pattern image storage unit; an element xi visualization unit that obtains visualized cross correlation images $\{A_{ij}|j=i+1, i+2, \ldots, N\}$ by reading a pattern image corresponding to an address generated from the address generation unit, from the pattern image storage unit, and mapping the read pattern image to a two-dimensional space; an addition operation unit 1 that generate a local pattern image Bi by synthesizing cross correlation images $\{A_{ij}|j=i+1, i+2, \ldots, N\}$ obtained from the element xi visualization unit; and an addition operation unit 2 that generates a feature vector image by synthesizing a local pattern image $\{B_i|i=1, 2, \ldots N-1\}$ obtained from the addition operation unit 1.

Further, the addition operation unit 1 that generates the local pattern image Bi further includes: a multiplier that performs multiplication of weight Wij by the cross correlation image Aij; and an adder that performs addition to the bias bi, in which the weight Wij and the bias bi are optimized (customized) while being learned by the supervised learning of the artificial intelligence neural network.

The means for solving the problem described above are merely and should not be construed as limiting the present disclosure. In addition to the embodiments described above, additional embodiments may exist in the drawings and detailed description of the disclosure.

As described above, the present disclosure relates to the artificial intelligence neural network apparatus for classifying data and the classification method based on the same, and more particularly, provides the apparatus and method capable of effectively classifying data by coupling the visualized feature vector with the artificial intelligence neural network.

FIG. 1 is an embodiment of an artificial intelligence neural network apparatus 100 coupled with a visualized feature vector.

Referring to FIG. 1, the artificial intelligence neural network apparatus 100 coupled with the visualized feature vector includes a learning database 10, a feature vector to image conversion unit 1 12, a learning feature vector image database 14, an artificial intelligence neural network 20, a test image 30, a data input unit 32, and a feature vector to image conversion unit 2 34.

According to an embodiment of the present disclosure, data (not illustrated) may be represented by a feature vector composed of N elements.

The learning database 10 is labeled which class it belongs to and may be composed of data represented by the feature vector.

The feature vector to image conversion unit 1 12 may visualize data stored in the learning database 10 to form the imaged learning feature vector image database 14.

The artificial intelligence neural network 20 is deep-learned by supervised learning using a learning feature vector image stored in the learning feature vector image database 14, and then may perform an image classification operation.

The data input unit 32 may receive a test image 30 to be classified and generate test data represented by the feature vector.

In addition, the feature vector to image conversion unit 2 34 may visualize the test data and convert the visualized test data into a test feature vector image.

An artificial intelligence neural network apparatus 100 is characterized by classifying which class the test feature vector image belongs to by the deeply learned artificial intelligence neural network 20.

The present disclosure uses any one selected from entropy, histogram, histogram of oriented gradients (HOG), wavelet transform, and dimensionality reduction techniques to extract feature vectors pre-selected by a human.

For the dimensionality reduction, any one of principal component analysis, linear discriminant analysis (LDA), factor analysis, multi-dimensional scaling (MDS), singular value decomposition (SVD), isometric feature mapping (Isomap), locally linear embedding (LLE), Hessian Eigenmapping (HLLE), and spectral embedding (Laplacian Eigenmaps) techniques may be used.

The artificial intelligence neural network 20 of the present disclosure includes a neural network capable of deep learning, and may use a convolutional neural network (CNN) and a recurrent neural network (RNN).

In the present disclosure, the artificial intelligence neural network is a neural network for allowing deep learning, and is configured by combining any one or more layers or elements selected from a convolution layer, a pooling layer, a ReLu layer, a transpose convolution layer, an unpooling layer, a 1×1 convolution layer, skip connection, a global average pooling (GAP) layer, a fully connected layer, a support vector machine (SVM), a long short term memory (LSTM), Atrous convolution, Atrous spatial pyramid pooling, separable convolution, and bilinear upsampling. In an example, the artificial intelligence neural network further includes an operation unit for a batch normalization operation in front end of the ReLu layer.

In the present disclosure, the deep learning of the artificial intelligence neural network may use a backpropagation algorithm technique that reduces an error between an output result and an actual value in the neural network, and may use any one algorithm selected from optimization algorithms such as stochastic gradient descent with momentum, Adagrad, Adam, and RMSProp algorithms. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

For the description of the present disclosure, assuming that the given feature vector is composed of N elements, each data may be represented by a feature vector composed of $\{x_1, x_2, \ldots, x_N\}$ which are N elements.

FIGS. 2A and 2B are of an embodiment of the feature vector to image conversion unit 1 12 and the feature vector to image conversion unit 2 34 for obtaining the imaged feature vector image by visualizing data based on the feature vector of FIG. 1.

According to the embodiment of the present disclosure, an address generation unit 90a may calculate an address for reading pattern images showing a relationship between element $x_i$ and other elements $\{x_j | j=i+1, i+2, \ldots, N\}$ for data represented by the feature vector composed of N elements $\{x_i | i \in 1, 2, \ldots, N\}$ from the pattern image storage unit 90.

In addition, element xi visualization units 70a, 70b, and 70c read the pattern image corresponding to the address generated by the address generation unit 90a from the pattern image storage unit 90, and as a result, may acquire cross correlation images $A_{ij}$ 60a, 60b, and 60c visualized by being mapped to a two-dimensional space.

The feature vector to image conversion unit 1 12 and the feature vector to image conversion unit 2 34 include addition operation units 1 52a, 52b, and 52c that generate local pattern images $B_i$ 72a, 72b, and 72c by synthesizing the cross correlation images $A_{ij}$ 60a, 60b, and 60c respectively obtained from the element $x_i$ visualization units 70a, 70b, and 70c, and an addition operation unit 2 70 that generates a feature vector image G 77 by synthesizing the local pattern images $B_i$ 72a, 72b, and 72c obtained from the addition operation unit 1.

The element $x_i$ visualization unit obtains $\{A_{ij} | j=i+1, i+2, \ldots, N\}$, which are the cross correlation images.

The addition operation unit 1 obtains $\{B_i | i=1, 2, \ldots, N-1\}$, which are the local pattern images.

For example, the cross correlation image $A_{12}$ 60a reads the pattern image showing the relationship between the element xi and the element $x_2$ from the pattern image storage unit 90 to indicate the cross correlation image visualized by being mapped to the two-dimensional space, and the cross correlation image $A_{13}$ 60b indicates the cross correlation image between the element $x_1$ and the element $x_2$.

In one example, the local pattern images $B_i$ 72a, 72b, and 72c are obtained by synthesizing the obtained cross correlation images $A_{ij}$ 60a, 60b, and 60c as in the following Equation 1.

$$B_i = \sum_{j=i+1}^{N} w_{ij} A_{ij} + b_i \text{ for a given } i = 1, 2, \ldots, N-1 \quad \text{Equation 1}$$

In the above Equation 1, weight $W_{ij}$ and bias $b_i$ are optimized (customized) while being learned by user defined variables or supervised learning applied according to application fields.

In an example, the addition operation unit 1 for generating the local pattern image $B_i$ may include a multiplier that performs multiplication of the weight $W_{ij}$ by the cross correlation image $A_{ij}$ and an adder that performs addition to the bias $b_i$.

In addition, the addition operation unit 1 provides the artificial intelligence neural network apparatus coupled with the visualized feature vector that is optimized while the weight $W_{ij}$ and the bias $b_i$ are deep-learned by the supervised learning of the artificial intelligence neural network.

In an example, the feature vector image G 77 is obtained by synthesizing the local pattern images $B_i$ 72a, 72b, and 72c using the following Equation 2.

$$G = \sum_{i=1}^{N-1} B_i \quad \text{Equation 2}$$

FIG. 2B illustrates an embodiment showing a process of obtaining the cross correlation image, the local pattern image $B_1$ 72a, $B_2$ 72b, and $B_{N-1}$ 72c, and the feature vector image G 77 using the feature vector to image conversion unit 1 and the feature vector to image conversion unit 2 12 and 34 in order to visualize data when the data is represented by the feature vector $\{x_1, x_2, \ldots, x_N\}$ composed of N elements. The local feature vector image $B_1$ 72a is a two-dimensional image obtained by synthesizing cross correlation images $A_{1j}$ mapped by reading the pattern image showing the relationship between the element $x_1$ and other elements $\{x_j | j=2, 3, \ldots, N\}$ from the pattern image storage unit 90, and is represented by the following Equation 3.

$$B_1 = \sum_{j=2}^{N} w_{1j} \cdot A_{1j} + bias_1 \quad \text{Equation 3}$$

In addition, the local pattern image $B_2$ 72b is a two-dimensional image obtained by synthesizing cross correlation images $A_{2j}$ 62a, 62b, and 62c visualizing the relationship between the element $x_2$ and other elements $\{x_j | j=3, \ldots, N\}$, and is represented by the following Equation 4.

$$B_2 = \sum_{j=3}^{N} w_{2j} \cdot A_{2j} + bias_2 \quad \text{Equation 4}$$

In this way, a local pattern image $B_{N-1}$ 72c is a two-dimensional image obtained from cross correlation image $A_{N-1}$ 64a visualizing a relationship between element $x_{N-1}$ and other elements $x_N$, and is represented by the following Equation 5.

$$B_{N-1} = \sum_{j=N}^{N} W_{N-1,j} \cdot A_{N-1,j} + bias_{N-1} \quad \text{Equation 5}$$

In addition, the feature vector image G 77 is a two-dimensional image obtained by synthesizing the obtained local pattern images 72a, 72b, and 72c, and is represented by the above Equation 2.

FIG. 2C illustrates an embodiment showing a process of obtaining cross correlation images $A_{12}$ 60a, $A_{13}$ 60b, and $A_{14}$ 60c and a local pattern image $B_1$ 72a through the feature vector to image conversion unit 1 and the feature vector to image conversion unit 2 12 and 34 in order to visualize data when the data is represented by a feature vector composed of four elements $\{x_1, x_2, x_3, x_4\}$.

For example, assuming that the four elements of the feature vector={ear size, weight, skin color, and eye size}, $x_1$=ear size, $x_2$=body weight, $x_3$=skin color, and $x_4$=eye size. In this case, the cross correlation image $A_{12}$ 60a is obtained by reading the pattern image stored in the corresponding address and mapping the read pattern image to the two-dimensional space by using $x_{1,\ new}$ and $x_{2,\ new}$ obtained by applying values of the element $x_1$ and the element $x_2$ to the following Equation 6 or Equation 7 as an address for selecting one of the pattern images stored in the pattern image storage unit 90.

Reference numeral 60b is a cross correlation image $A_{13}$ formed by the element $x_1$ and the element $x_3$.

Reference numeral 60c is a cross correlation image $A_{14}$ formed by the element $x_1$ and the element $x_4$.

Reference numeral 72a is a local pattern image $B_1$ generated by synthesizing the three obtained cross correlation images $A_{12}$ 60a, $A_{13}$ 60b, and $A_{14}$ 60c by the addition operation unit 1 52a.

In an example, the cross correlation image of the present disclosure may be obtained by mapping each data based on the feature vector to the two-dimensional space in the form of a pattern image.

In order to determine the pattern image to be mapped, the pattern image storage unit 90 storing various pattern images and an address for selecting one of the pattern images stored in the pattern image storage unit 90 are required.

The address is obtained by the address generation unit 90a, and values $x_{i,\ new}$ and $x_{j,\ new}$ obtained by standardization that has the element $x_i$ and element $x_j$ and depends on the following Equation 6 are used as an address.

$$x_{i,new} = \frac{x_i - \mu_i^{DB}}{\sigma_i^{DB}}, \quad x_{j,new} = \frac{x_j - \mu_j^{DB}}{\sigma_j^{DB}} \quad \text{Equation 6}$$

In Equation 6, when $x_i^{DB}$ and $x_j^{DB}$ are the elements $x_i$ and $x_j$ components of the feature vector stored in the learning database 10, $\mu_i^{DB}$ is a mean value of $x_i^{DB}$, $\mu_j^{DB}$ is a mean value of $x_j^{DB}$, $\sigma_i^{DB}$ is a standard deviation of $x_i^{DB}$, and $\sigma_j^{DB}$ is a standard deviation of $x_j^{DB}$.

That is, when data based on the feature vector is mapped to the two-dimensional space in the form of the pattern image, the pattern images stored in the addresses $x_{i,\ new}$ and $x_{j,\ new}$ are read from the pattern image storage unit 90 and mapped.

If the addresses are out of the address range of the pattern image storage unit 90, in an example, a null pattern is read and mapped.

In an example, another aspect of the address generation unit 90a is to determine the addresses by the following Equation 7.

$$x_{i,new} = \frac{x_i - \mu_i^{DB}}{\sigma_i^{DB}} \times \text{Number of classes} \quad \text{Equation 7}$$

$$x_{j,new} = \frac{x_j - \mu_j^{DB}}{\sigma_j^{DB}} \times \text{Number of classes}$$

In the above Equation 7, the number of classes refers to the number of classes (categories) to be classified by the artificial intelligence neural network 20.

In an example, the addresses are multiplied by a predetermined scaling factor to cover the address range of the pattern image storage unit 90, and then converted into an integer value by rounding to be used.

FIG. 3A illustrates an embodiment of the pattern image storage unit 90.

The cross correlation image $A_{ij}$ is generated by reading the pattern images corresponding to the address values given by the above $x_{i,\ new}$ and $x_{j,\ new}$.

Reference numeral 92 denotes pattern image storage locations 92a, 92b, and 92c for generating cross correlation images $A_{12}, A_{13}, \ldots, A_{1N}$, as a pattern storage location that stores the pattern image for generating the cross correlation image $A_{1j}$.

Reference numeral 92a denotes a pattern storage location for generating the cross correlation image $A_{13}$ as a pattern storage location that stores the pattern image for generating the cross correlation image $A_{12}$. In addition, reference numeral 92c denotes a pattern storage location for generating the cross correlation image $A_{1N}$.

Reference numeral 94 denotes pattern image storage locations 94a, 94b, and 94c for generating cross correlation images $A_{22}, A_{23}, \ldots, A_{2N}$ as a pattern storage location that stores the pattern image for generating the cross correlation image $A_{2j}$.

Reference numeral 96 denotes a pattern image storage location 96a that stores a pattern image for generating a cross correlation images $A_{N-1,\ N}$.

FIG. 3B illustrates embodiments of various pattern images stored in the pattern image storage unit 90.

The artificial intelligence neural network apparatus 100, a learning database 10, a feature vector to image conversion unit 1 12, a learning feature vector image database 14, an artificial intelligence neural network 20, a test image 30, a data input unit 32, and a feature vector to image conversion unit 2 34, and the pattern image storage unit 90 in FIGS. 1-3B that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-3B that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An artificial intelligence neural network apparatus coupled with a visualized feature vector, comprising:
   a labeled learning database having data of a feature vector composed of N elements;
   a first feature vector image converter configured to visualize the data in the labeled learning database to form an imaged learning feature vector image database;
   a deep-learned artificial intelligence neural network configured to use a learning feature vector image in the learning feature vector image database to perform an image classification operation;

an inputter configured to receive a test image, and generate test data based on the feature vector; and a second feature vector image converter configured to visualize the test data and convert the visualized test data into a test feature vector image, wherein the deep-learned artificial intelligence neural network is configured to determine a class of the test feature vector image, and wherein the first feature vector image converter includes:

a pattern image storage configured to store pattern images of a relationship between element $x_i$ and other elements $\{x_j|j=i+1, i+2, \ldots, N\}$ for data represented by a feature vector composed of the N elements $\{x_i|i \in 1, 2, \ldots, N\}$;

an address generator configured to calculate an address for reading the pattern image from the pattern image storage;

an element $x_i$ visualizer configured to obtain visualized cross correlation images $\{A_{ij}|j=i+1, i+2, \ldots, N\}$ by reading a pattern image corresponding to the address generated from the address generator and mapping the pattern image read into a two-dimensional space;

a first addition operator configured to generate a local pattern image $B_i$ by synthesizing cross correlation images $\{A_{ij}|j=i+1, i+2, \ldots, N\}$ obtained from the element $x_i$ visualizer; and a second addition operator configured to generate a feature vector image by synthesizing a local pattern image $\{B_i|i=1, 2, \ldots, N-1\}$ obtained from the first addition operator.

2. The artificial intelligence neural network apparatus of claim 1, wherein the deep-learned artificial intelligence neural network is deep-learned by supervised learning using the learning feature vector image stored in the learning feature vector image database.

3. The artificial intelligence neural network apparatus of claim 1, wherein the first addition operator further includes:

a multiplier configured to perform multiplication of weight $W_{ij}$ by the cross correlation image $A_{ij}$; and an adder configured to perform addition to the bias $b_i$, wherein the weight $W_{ij}$ and the bias $b_i$ are customized while being learned by a supervised learning of the deep-learned artificial intelligence neural network.

4. A processor implemented artificial intelligence neural network method, the method comprising:

visualizing data in a labeled learning database to form an imaged learning feature vector image database, wherein the labeled learning database has the data composed of N elements;

using a learning feature vector image in the learning feature vector image database to perform an image classification operation;

receiving a test image and generating test data based on the feature vector;

visualizing the test data and converting the visualized test data into a test feature vector image;

determining a class of the test feature vector image;

storing pattern images of a relationship between element $x_i$ and other elements $\{x_j|j=i+1, i+2, \ldots, N\}$ for data represented by a feature vector composed of the N elements $\{x_i|i \in 1, 2, \ldots, N\}$;

calculating an address for reading the pattern image from the pattern image storage;

obtaining visualized cross correlation images $\{A_{ij}|j=i+1, i+2, \ldots, N\}$ by reading a pattern image corresponding to the address generated from the address generator and mapping the pattern image read into a two-dimensional space;

generating a local pattern image $B_i$ by synthesizing cross correlation images $\{A_{ij}|j=i+1, i+2, \ldots, N\}$ obtained from the element $x_i$ visualizer; and generating a feature vector image by synthesizing a local pattern image $\{B_i|i=1, 2, \ldots, N-1\}$ obtained from the first addition operator.

5. The method of claim 4, further including:

performing multiplication of weight $W_{ij}$ by the cross correlation image $A_{ij}$; and performing addition to the bias $b_i$, wherein the weight $W_{ij}$ and the bias $b_i$ are customized while being learned by a supervised learning of a deep-learned artificial intelligence neural network.

* * * * *